United States Patent
Xia et al.

(10) Patent No.: US 12,411,066 B2
(45) Date of Patent: Sep. 9, 2025

(54) DYNAMIC FRICTION EXPERIMENTAL DEVICE AND METHOD FOR TESTING DYNAMIC MECHANICAL PROPERTY OF MATERIAL

(71) Applicant: TIANJIN UNIVERSITY, Tianjin (CN)

(72) Inventors: Kaiwen Xia, Tianjin (CN); Ying Xu, Tianjin (CN); Bangbiao Wu, Tianjin (CN); Wei Yao, Tianjin (CN); Peng Dong, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 382 days.

(21) Appl. No.: 18/143,625

(22) Filed: May 5, 2023

(65) Prior Publication Data
US 2023/0358655 A1 Nov. 9, 2023

(30) Foreign Application Priority Data
May 6, 2022 (CN) .......................... 202210518214.2

(51) Int. Cl.
*G01N 3/22* (2006.01)
*G01N 3/02* (2006.01)
(Continued)

(52) U.S. Cl.
CPC ................ *G01N 3/22* (2013.01); *G01N 3/08* (2013.01); *G01N 3/02* (2013.01); *G01N 3/04* (2013.01);
(Continued)

(58) Field of Classification Search
CPC .. G01N 3/22; G01N 3/08; G01N 3/36; G01N 3/02; G01N 3/04; G01N 3/26; G01N 3/56;
(Continued)

(56) References Cited

U.S. PATENT DOCUMENTS

2023/0133728 A1* 5/2023 Macdougall ............. G01N 3/30
73/12.09

FOREIGN PATENT DOCUMENTS

CN 104697854 A 6/2015
CN 105181486 A 12/2015
(Continued)

OTHER PUBLICATIONS

Wu Shiyi, et al., The Study of the Experiment of Torsion SHB Used at High Strain Rate, Journal of Tianjin University, 1994, pp. 277-283, vol. 27, No. 3.
(Continued)

*Primary Examiner* — Jonathan M Dunlap
(74) *Attorney, Agent, or Firm* — Bayramoglu Law Offices LLC (57) ABSTRACT

A dynamic friction experimental device includes a base, an incident bar, an axial compression device, and a torque loading device. The base is provided with a displacement-constrain structure, and the incident bar includes a first incident section and a second incident section. The first incident section is arranged adjacent to the displacement-constrain structure, and the second incident section is connected to the first incident section. At a joint of the first incident section and the second incident section, a projection of a cross section of the first incident section is positioned in a cross section of the second incident section along an axial direction of the second incident section. When the dynamic mechanical property of a specimen is tested, the axial compression device is configured to apply pressure to the second incident section, and the torque loading device is configured to apply torque to the second incident section.

8 Claims, 7 Drawing Sheets

(51) Int. Cl.
*G01N 3/08* (2006.01)
*G01N 3/04* (2006.01)
*G01N 3/26* (2006.01)

(52) U.S. Cl.
CPC ....... *G01N 3/26* (2013.01); *G01N 2203/0019* (2013.01)

(58) Field of Classification Search
CPC ... G01N 2203/0019; G01N 2203/0037; G01N 2203/0048; G01N 19/02
See application file for complete search history.

(56) References Cited

FOREIGN PATENT DOCUMENTS

| | | | | |
|---|---|---|---|---|
| CN | 111044352 A | | 4/2020 | |
| CN | 111366485 A | | 7/2020 | |
| CN | 111665152 A | | 9/2020 | |
| CN | 112782007 A | | 5/2021 | |
| CN | 116593280 A | * | 8/2023 | ............... G01N 3/02 |
| JP | 2007278816 A | | 10/2007 | |

OTHER PUBLICATIONS

Xiao Yu, et al., A Review of the Torsional Split Hopkinson Bar, Advances in Civil Engineering, 2018, pp. 1-17, vol. 2018, Article ID 2719741.

* cited by examiner

DYNAMIC FRICTION EXPERIMENTAL DEVICE AND METHOD FOR TESTING DYNAMIC MECHANICAL PROPERTY OF MATERIAL

CROSS REFERENCE TO THE RELATED APPLICATIONS

This application is based upon and claims priority to Chinese Patent Application No. 202210518214.2, filed on May 6, 2022, the entire contents of which are incorporated herein by reference.

TECHNICAL FIELD

The present application relates to the field of an experimental device for dynamic mechanical property of a material, and in particular to a dynamic friction experimental device and a method for testing dynamic mechanical property of a material.

BACKGROUND

In the fields of aerospace, transportation, tunnel excavation, and the like, an engineering structure or a material is usually in a composite action state of compression and torsion, and may be subjected to a plurality of loads in a short period of time, so that mechanical parameters of the material at a high strain rate, such as mechanical properties of deformation state, strength, work hardening and toughness, are obviously different from a static single load loading condition. Therefore, understanding and knowing the mechanical parameters of the material at the high strain rate is of great significance for engineering design and calculation. The Hopkinson torsion bar is an experimental device used to study the mechanics of a material in a dynamic compression-shear composite state.

Generally, the Hopkinson torsion bar includes an incident bar, a clamping device, and a loading device, one end of the incident bar is connected to the loading device, the other end of the incident bar is connected to a material specimen, and the clamping device is positioned between the specimen and the loading device, and can clamp and lock the incident bar. During the experiment, the clamping device is usually used to lock the incident bar, so that one section of the incident bar that is close to the loading device can be subjected to torsion and deformation along with the loading device to achieve the purpose of storing energy. After the stored energy reaches a predetermined value, the locking action of the clamping device is unlocked instantly, so that the energy stored in the incident bar is transmitted to a specimen in a form of a wave to complete the loading of the specimen.

However, the incident bar of the Hopkinson torsion bar can only perform instantaneous single loading on the specimen. In practical engineering, the material is exposed to a complex stress environment and usually subjected to a plurality of instantaneous loadings, so that the conventional Hopkinson torsion bar cannot meet the requirement.

SUMMARY

Aiming at the above defects in the prior art, the present invention provides a dynamic friction experimental device and a method for testing dynamic mechanical property of a material, which can perform instantaneous and multiple continuous dynamic torque loadings with different amplitudes on a specimen.

To achieve the above objective, in a first aspect, the present invention discloses a dynamic friction experimental device, including:

- a base, wherein the base is provided with a displacement-constrain structure, and the displacement-constrain structure is abutted against a first end face of a specimen when the dynamic mechanical property of the specimen is tested;
- an incident bar, wherein the incident bar and the displacement-constrain structure are positioned on the same side of the base, and the incident bar includes at least two sections which are coaxially arranged, wherein one section arranged close to the displacement-constrain structure is a first incident section, and the other section connected to the first incident section is a second incident section; at a joint of the first incident section and the second incident section, a cross-sectional area of the first incident section is less than a cross-sectional area of the second incident section, and a projection of a cross section of the first incident section is positioned in a cross section of the second incident section along an axial direction of the second incident section; when the dynamic mechanical property of the specimen is tested, one end that is of the first incident section and that faces the displacement-constrain structure is abutted against a second end face of the specimen;
- an axial compression device, wherein the axial compression device is connected to one end that is of the second incident section and that is far away from the first incident section, and is configured to apply pressure to the second incident section; and
- a torque loading device, wherein the torque loading device is connected to the second incident section, and is configured to apply torque to the second incident section.

In this embodiment, when the dynamic mechanical property of a specimen is tested, the displacement-constrain structure is abutted against the first end face of the specimen, one end that is of the first incident section and that faces the displacement-constrain structure is abutted against the second end face of the specimen, the first incident section and the second incident section are coaxially arranged, the axial compression device is connected to that is one end of the second incident section and that is far away from the first incident section, and the torque loading device is connected to the second incident section, so that when the dynamic friction experimental device tests the dynamic mechanical property of the specimen, the axial compression device can apply pressure to the second incident section, then the applied pressure is conducted to the specimen through the second incident section and the first incident section, and the torque loading device can apply torque to the second incident section, and can apply torque to the specimen in the form of a torsional wave through the first incident section and the second incident section, so that the specimen can be subjected to a composite loading of axial compression (namely, pressure applied in an axial direction of the second incident section) and torque, that is, the specimen can be in a composite action state of compression and torsion, therefore, the mechanical parameters of the specimen under the action of the composite load can be measured.

Moreover, at the joint of the first incident section and the second incident section, the cross-sectional area of the first incident section is less than the cross-sectional area of the second incident section, the projection of the cross section of the first incident section is positioned in the cross section of the second incident section along the axial direction of the second incident section, so that the second incident section forms a reflecting interface on an end face facing the first incident section; therefore, when the dynamic mechanical property of the specimen is tested, the torque loading device applies torque to the second incident section, and after the torque is conducted to the specimen through the second incident section and the first incident section in the form of the torsional wave, a part of the torsional wave is transmitted out, and a part of the torsional wave is reflected to the first incident section and the second incident section. In this case, after the reflected torsional wave reaches the reflecting interface, the reflecting interface can transmit the torsional wave to the specimen again and conduct the torsional wave to the specimen, so that the torsional wave can be conducted between the reflecting interface and the specimen many times. After the torque loading device applies torque to the second incident section, the specimen can be subjected to multiple continuous dynamic torque loading with different amplitudes in a short period of time, and therefore mechanical parameters of the specimen in a composite action of compression and torsion can be closer to the reality, so as to provide important data reference for engineering design and calculation.

In a possible implementation of the first aspect, the specimen is of a circular-ring sheet structure, and the first incident section is of a circular-ring tubular structure; wherein an inner diameter of the first incident section is less than an outer diameter of the specimen, and an outer diameter of the first incident section is greater than an inner diameter of the specimen.

In a possible implementation of the first aspect, the second incident section is also of a circular-ring tubular structure, and a wall thickness of the second incident section is greater than a wall thickness of the first incident section.

In a possible implementation of the first aspect, the outer diameter of the first incident section is less than an outer diameter of the second incident section, and the inner diameter of the first incident section is the same as an inner diameter of the second incident section; or, the outer diameter of the first incident section is the same as the outer diameter of the second incident section, and the inner diameter of the first incident section is greater than the inner diameter of the second incident section.

In a possible implementation of the first aspect, the torque has a reflection coefficient R at the joint of the first incident section and the second incident section, R=1−T, wherein T is a transmission coefficient of the torque at the joint of the first incident section and the second incident section, $$T = \frac{2\left(\frac{A_1 \rho_1 I_1}{A_2 \rho_2 I_2}\right)}{\sqrt{4\left(\frac{A_1 \rho_1 I_1}{A_2 \rho_2 I_2}\right)^2 + 1}},$$

and 0.25≤T<1, wherein $A_1$ is the cross-sectional area of the first incident section, $\rho_1$ is a density of the first incident section, $I_1$ is a moment of inertia of the first incident section, $A_2$ is the cross-sectional area of the second incident section, $\rho_2$ is a density of the second incident section, and $I_2$ is a moment of inertia of the second incident section; and $$I_1 = \frac{1}{2} m_1 (R_1^2 - r_1^2),$$

wherein $m_1$ is a mass of the first incident section, $R_1$ is a radius of an outer side wall of the first incident section, and $r_1$ is a radius of an inner side wall of the first incident section; and $$I_2 = \frac{1}{2} m_2 (R_2^2 - r_2^2),$$

wherein $m_2$ is a mass of the second incident section, $R_2$ is a radius of an outer side wall of the second incident section, and $r_2$ is a radius of an inner side wall of the second incident section.

In a possible implementation of the first aspect, the radius of the inner side wall of the first incident section $r_1 = R_1 - t_1$, wherein 40 mm≤$R_1$<60 mm, $t_1$ is the wall thickness of the first incident section, and 5 mm≤$t_1$<10 mm; and the radius of the inner side wall of the second incident section $r_2 = R_2 - t_2$, wherein 40 mm≤$R_2$<60 mm, $t_2$ is the wall thickness of the second incident section, and 5 mm≤$t_2$<10 mm.

In a possible implementation of the first aspect, the torque loading device includes racks and gears which are engaged with each other, the racks are fixed on the base, and the gears are fixedly connected to the second incident section.

In a possible implementation of the first aspect, the experimental device further includes:

an energy storage bar, wherein one end of the energy storage bar is fixedly connected to the second incident section, the other end of the energy storage bar is abutted against the axial compression device and is rotatably connected to the axial compression device, and the gears are sleeved on the energy storage bar; and a clamping device, wherein the clamping device is positioned between the torque loading device and the second incident section, the clamping device includes a clamping servo-controlled hydraulic cylinder, a fixing plate, and a first frictional clamp and a second frictional clamp which are arranged at intervals oppositely, the clamping servo-controlled hydraulic cylinder and the first frictional clamp are both fixedly arranged on the base, the second frictional clamp is connected to the base in a sliding manner, and the clamping servo-controlled hydraulic cylinder is connected to the second frictional clamp; sides that are of the first frictional clamp and the second frictional clamp and that are far away from the base are both connected to the fixing plate, and the energy storage bar penetrates between the first frictional clamp and the second frictional clamp; when the second frictional clamp moves to the first frictional clamp through the clamping servo-controlled hydraulic cylinder until the first frictional clamp and the second frictional clamp are both in close contact with the energy storage bar, the first frictional clamp and the second frictional clamp can clamp the energy storage bar; and when the fixing plate is pulled apart, the first frictional clamp and the second frictional clamp can release the clamping limitation on the energy storage bar.

In a second aspect, the present invention further provides a method for testing dynamic mechanical property of a material, which is applied to the dynamic friction experimental device described in the first aspect, wherein the method includes:

installing a data collection system, and connecting the data collection system to an outer peripheral wall of the incident bar;

fixing the specimen on one end that is of the incident bar and that faces the displacement-constrain structure;

starting the data collection system;

applying axial compression to the incident bar to an axial compression set value through the axial compression device;

applying torque to the incident bar to a torque set value through the torque loading device; and collecting data through the data collection system and analyzing the data.

In this embodiment, the dynamic mechanical property of the specimen can be tested on the dynamic friction experimental device by this method, and the specimen can be subjected to multiple continuous dynamic torque loading with different amplitudes in a short period of time, so that the dynamic mechanical property parameter of the specimen measured by the method is closer to the dynamic mechanical property parameter of the specimen in an actual stress environment. Moreover, the dynamic friction experimental device applied by the method is the dynamic friction experimental device in the first aspect, so that the method for testing the dynamic mechanical property of the material can produce the same or similar beneficial effects as the experimental device in the first aspect.

In a possible implementation of the second aspect, the experimental device further includes a clamping device and an energy storage bar, wherein one end of the energy storage bar is fixedly connected to one end that is of the incident bar and that is far away from the specimen, the other end of the energy storage bar is abutted against and rotatably connected to the axial compression device, the clamping device is fixedly arranged on the base and is positioned between the torque loading device and the incident bar, and the energy storage bar penetrates through the clamping device.

After the axial compression is applied to the incident bar through the axial compression device to an axial compression set value, and before the torque is applied to the incident bar through the torque loading device to a torque set value, the method further includes:

clamping the energy storage bar through the clamping device, so that the energy storage bar can store the torque applied by the torque loading device.

BRIEF DESCRIPTION OF THE DRAWINGS

To describe the technical solutions in embodiments of the present invention more clearly, the following briefly describes the accompanying drawings required for describing the embodiments. Apparently, the accompanying drawings in the following description show some embodiments of the present invention, and those of ordinary skill in the art may still derive other drawings from these accompanying drawings without creative efforts.

DESCRIPTIONS OF REFERENCE NUMERALS

1—base; 2—front baffle plate; 3—axial compression device; 4—energy storage bar; 5—torque loading device; 51—torque servo-controlled hydraulic cylinder; 52—rack; 53—gear; 6—clamping device; 61—clamping servo-controlled hydraulic cylinder; 62—first frictional clamp; 63—second frictional clamp; 64—fixing plate; 7—incident bar; 71—first incident section; 72—second incident section; 73—reflecting interface; 8—specimen; 9—displacement-constrain structure; 91—displacement-constrain block; 10—rear baffle plate; 11—pull rod; 12—sleeve; and 100—experimental device.

DETAILED DESCRIPTION OF THE EMBODIMENTS

The following clearly and completely describes the technical solutions in embodiments of the present invention with reference to the accompanying drawings in embodiments of the present invention. It is clear that the described embodiments are merely a part rather than all of embodiments of the present invention. All other embodiments obtained by those of ordinary skill in the art based on embodiments of the present invention without creative efforts shall fall within the protection scope of the present invention.

In the present invention, directions or positional relationships indicated by terms "upper", "lower", "left", "right", "front", "rear", "top", "bottom", "inner", "outer", "vertical", "horizontal", "transverse", "longitudinal", and the like are those shown based on the accompanying drawings. These terms are mainly used to better describe the present invention and embodiments thereof, and are not intended to limit that the indicated devices, elements or components must have a specific orientation or be constructed and operated in a specific orientation.

Moreover, some of the above terms may be used to represent other meanings besides orientation or positional relationship, for example, the term "upper" may also be used in some conditions to represent a certain attaching or connecting relationship. Those of ordinary skill in the art may understand specific meanings of these terms in the present invention according to a specific condition.

Furthermore, the terms "installation", "arranged", "provided", "connection", and "connected to" shall be understood in a broad sense. For example, the "connection" may be a fixed connection, a removable connection, or an integral construction; may be a mechanical connection or an electrical connection; and may be a direct connection, an indirect connection by using an intermediate medium, or an internal communication between two devices, elements, or components. Those of ordinary skill in the art may understand specific meanings of the foregoing terms in the present invention according to a specific condition.

Furthermore, the terms "first", "second", and the like are mainly used to distinguish different devices, elements or components (the specific type and configuration may or may not be the same), and are not used to indicate or imply the relative importance or number of the indicated devices, elements, or components. Unless otherwise stated, "a plurality of" means two or more than two.

Embodiments of the present invention provide a dynamic friction experimental device and a method for testing dynamic mechanical property of a material, which can perform instantaneous and multiple continuous dynamic torque loadings with different amplitudes on a specimen.

The following describes in detail, by using specific embodiments, the dynamic friction experimental device and the method for testing dynamic mechanical property of the material.

Embodiment 1

An embodiment of the present application provides a dynamic friction experimental device, as shown in FIGS. 1 to 4, which includes: a base 1, an incident bar 7, an axial compression device 3, and a torque loading device 5, wherein the base 1 is provided with a displacement-constrain structure 9, and the displacement-constrain structure 9 is abutted against a first end face of a specimen 8 when the dynamic mechanical property of the specimen 8 is tested; the incident bar 7 and the displacement-constrain structure 9 are positioned on the same side of the base 1, and the incident bar 7 includes at least two sections which are coaxially arranged, wherein one section arranged close to the displacement-constrain structure 9 is a first incident section 71, and the other section connected to the first incident section 71 is a second incident section 72, at a joint of the first incident section 71 and the second incident section 72, a cross-sectional area of the first incident section 71 is less than a cross-sectional area of the second incident section 72, and a projection of a cross section of the first incident section 71 is positioned in a cross section of the second incident section 72 along an axial direction of the second incident section 72; when the dynamic mechanical property of the specimen 8 is tested, one end that is of the first incident section 71 and that faces the displacement-constrain structure 9 is abutted against a second end face of the specimen 8; the axial compression device 3 is connected to one end that is of the second incident section 72 and that is far away from the first incident section 71, and is configured to apply pressure to the second incident section 72; and the torque loading device 5 is connected to the second incident section 72, and is configured to apply torque to the second incident section 72.

The dynamic friction experimental device of the present application can be a Hopkinson torsion bar experimental device. The Hopkinson torsion bar experimental device is an experimental device used for physical and mechanical property in the fields of mechanics, basic disciplines of engineering and technical science, material science, and mechanical engineering, and may be used to study mechanical parameters of engineering materials in a dynamic compression-shearing or pulling-shearing composite state. This device is generally composed of parts such as a base, an incident bar, and a torque loading device, and in the experiment, a data collection system is connected to a Hopkinson torsion bar to collect and store data so as to obtain mechanical parameters of the material at a high strain rate.

Figure 1:
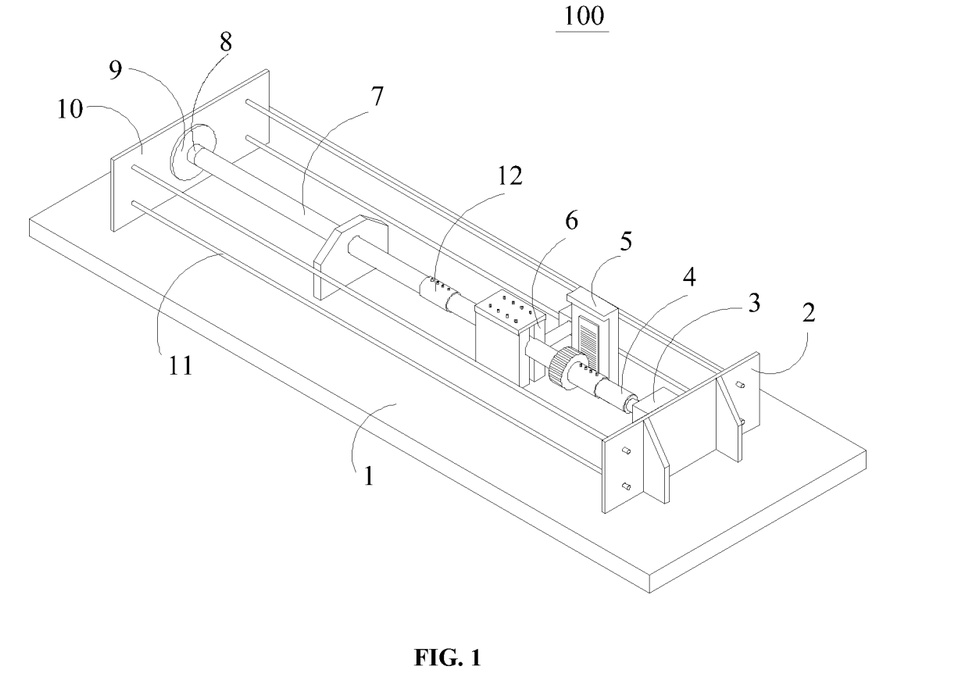
FIG. 1 is a schematic diagram of a structure of a dynamic friction experimental device according to an embodiment of the present invention.

In this embodiment, when the dynamic mechanical property of the specimen 8 is tested, the displacement-constrain structure 9 is abutted against the first end face of the specimen 8, one end that is of the first incident section 71 and that faces the displacement-constrain structure 9 is abutted against the second end face of the specimen 8, the first incident section 71 and the second incident section 72 are coaxially arranged, the axial compression device 3 is connected to one end that is of the second incident section 72 and that is far away from the first incident section 71, and the torque loading device 5 is connected to the second incident section 72, so that when the dynamic friction experimental device tests the dynamic mechanical property of the specimen 8, the axial compression device 3 can apply pressure to the second incident section 72, then the applied pressure is conducted to the specimen 8 through the second incident section 72 and the first incident section 71, and the torque loading device 5 can apply torque to the second incident section 72, and can apply torque to the specimen 8 in the form of a torsional wave through the first incident section 71 and the second incident section 72, so that the specimen 8 can be subjected to a composite loading of axial compression (namely, pressure applied in an axial direction of the second incident section 72) and torque, that is, the specimen 8 can be in a composite action state of compression and torsion, therefore, the mechanical parameters of the specimen 8 under the action of the composite load can be measured.

Moreover, at the joint of the first incident section 71 and the second incident section 72, the cross-sectional area of the first incident section 71 is less than the cross-sectional area of the second incident section 72, the projection of the cross section of the first incident section 71 is positioned in the cross section of the second incident section 72 along the axial direction of the second incident section 72, so that the second incident section 72 forms a reflecting interface 73 on an end face facing the first incident section 71; therefore, when the dynamic mechanical property of the specimen 8 is tested, the torque loading device 5 applies torque to the second incident section 72, and after the torque is conducted to the specimen 8 through the second incident section 72 and the first incident section 71 in the form of the torsional wave, a part of the torsional wave is transmitted out, and a part of the torsional wave is reflected to the first incident section 71 and the second incident section 72. In this case, after the reflected torsional wave reaches the reflecting interface 73, the reflecting interface 73 can transmit the torsional wave to the specimen 8 again and conduct the torsional wave to the specimen 8, so that the torsional wave can be conducted between the reflecting interface 73 and the specimen 8 many times. After the torque loading device 5 applies torque to the second incident section 72, the specimen 8 can be subjected to multiple continuous dynamic torque loading with different amplitudes in a short period of time, and therefore mechanical parameters of the specimen 8 in a composite action of compression and torsion can be closer to the reality, so as to provide important data reference for engineering design and calculation.

In addition, the displacement-constrain structure 9, the incident bar 7, the axial compression device 3, and the torque loading device 5 are all positioned on the same side of the base 1, and the displacement-constrain structure 9, the axial compression device 3, and the torque loading device 5 are all fixedly arranged on the base 1, so that the experimental device 100 is compact in structure, and occupied space is saved.

In this embodiment, when the dynamic mechanical property of the specimen 8 is tested, the specimen 8 is fixed between the first incident section 71 and the displacement-constrain structure 9, wherein the specimen 8 may be fixedly arranged on the end face of the first incident section 71, for example, the specimen 8 may be adhered to the first incident section 71 through glue, the specimen 8 is abutted against the displacement-constrain structure 9, and when the torque applied to the specimen 8 is greater than the maximum static friction force between the specimen 8 and the displacement-constrain structure 9, the specimen 8 can rotate relative to the displacement-constrain structure 9 to release part of the torque applied to the specimen 8.

In addition, along the axial direction of the first incident section 71, a length of the specimen 8 is much less than that of the first incident section 71, and a shape of the specimen 8 may correspond to a shape of the end face of the first incident section 71, that is, when the shape of the end face of the first incident section 71 is a circle, the shape of the specimen 8 may be of a thin disk-shaped structure; when the shape of the end face of the first incident section 71 is a circular ring, the shape of the specimen 8 may be of a thin circular-ring sheet structure, or may be other corresponding shapes, which is are not limited herein, provided that the first incident section 71 can fix the specimen 8 on the end face and the specimen 8 can be fixed between the first incident section 71 and the displacement-constrain structure 9. The following will describe in detail an example in which the shape of the specimen 8 is of a thin circular-ring sheet structure and the shape of the end face of the first incident section 71 is a circular ring.

The specimen 8 is of a circular-ring sheet structure, and the first incident section 71 is of a circular-ring tubular structure; wherein an inner diameter of the first incident section 71 is less than an outer diameter of the specimen 8, and an outer diameter of the first incident section 71 is greater than an inner diameter of the specimen 8. Therefore, the inner diameter of the specimen 8 may be prevented from being greater than the outer diameter of the first incident section 71, the outer diameter of the specimen 8 may be prevented from being less than the inner diameter of the first incident section 71, a case that the specimen 8 cannot be directly fixed on the end face by the first incident section 71 is avoided, and a case that the specimen 8 cannot be fixed between the first incident section 71 and the displacement-constrain structures 9 when the dynamic mechanical property of the specimen 8 is tested is prevented.

It should be noted that, the first incident section 71 having a circular tubular structure means that the first incident section 71 has a uniform outer diameter and inner diameter in any radial cross section.

Specifically, there are various cases between the inner diameter and the outer diameter of the first incident section 71 and the inner diameter and the outer diameter of the specimen 8. In a first possible case, the inner diameter of the first incident section 71 is less than the outer diameter of the specimen 8, and the outer diameter of the first incident section 71 is greater than or equal to that of the specimen 8; in this case, the inner diameter of the specimen 8 may be greater than, less than, or equal to the inner diameter of the first incident section 71, and the end face of the specimen 8 is positioned in the end face of the first incident section 71. In a second possible case, the outer diameter of the first incident section 71 is less than that of the specimen 8, and the outer diameter of the first incident section 71 is greater than the inner diameter of the specimen 8; in this case, the inner diameter of the specimen 8 may be greater than, less than, or equal to the inner diameter of the first incident section 71, and the end face of the specimen 8 may partially protrude outside the peripheral wall of the first incident section 71. In the above cases, the specimen 8 can be fixed between the first incident section 71 and the displacement-constrain structure 9 through the first incident section 71, so as to ensure smooth performance of the dynamic mechanical property test of the specimen 8.

Preferably, the inner diameter of the first incident section 71 is the same as that of the specimen 8, and the outer diameter of the first incident section 71 is the same as that of the specimen 8, which prevents that the outer diameter of the specimen 8 is less than that of the first incident section 71, resulting in that the partial torque applied by the torque loading device 5 and the pressure applied by the axial compression device 3 are not applied to the specimen 8, and the load partially applied is wasted; meanwhile, it can also prevent that the outer diameter of the specimen 8 is greater than that of the first incident section 71, resulting in that a part of the specimen 8 cannot receive the action of torque and pressure, and the specimen 8 is stressed unevenly.

Figure 2:
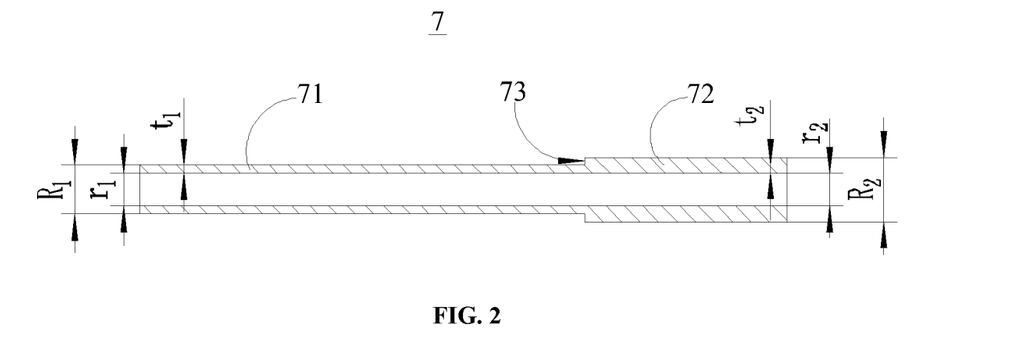
FIG. 2 is a first cross-sectional view of an incident bar according to an embodiment of the present invention.
Figure 3:
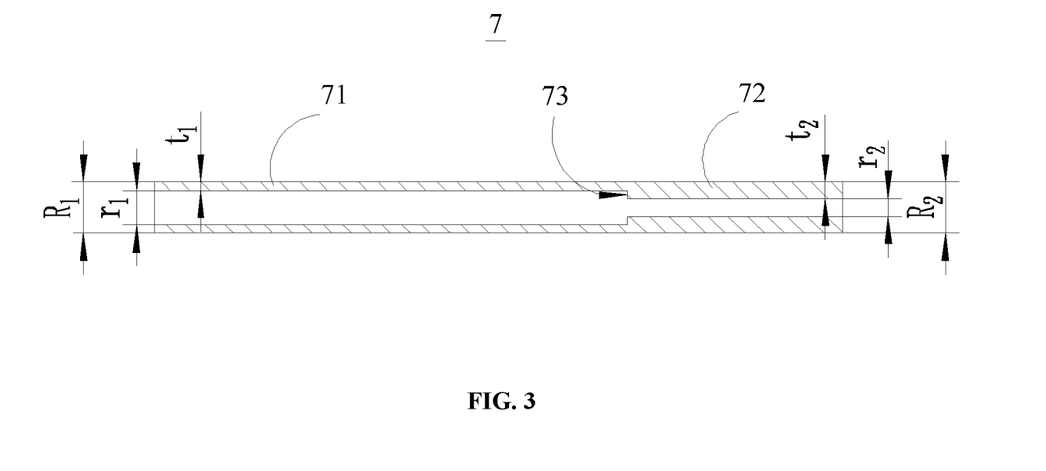
FIG. 3 is a second cross-sectional view of an incident bar according to an embodiment of the present invention.
Figure 4:
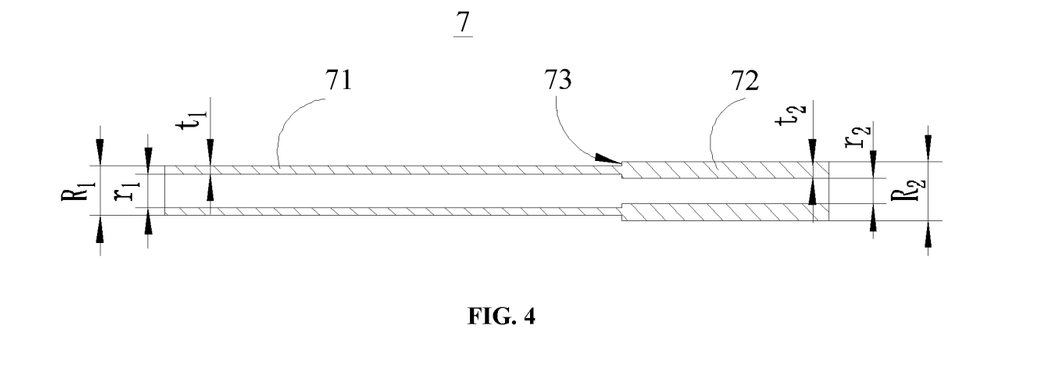
FIG. 4 is a third cross-sectional view of an incident bar according to an embodiment of the present invention.

As shown in FIGS. 2 to 4, the second incident section 72 is also of a circular-ring tubular structure, and a wall thickness of the second incident section 72 is greater than that of the first incident section 71. By setting the wall thickness of the second incident section 72 to be greater than that of the first incident section 71, the cross section of the first incident section 71 is positioned in the cross section of the second incident section 72 at the joint of the first incident section 71 and the second incident section 72, so that the reflecting interface 73 is formed on the end face that is of the second incident section 72 and that faces the first incident section 71, which is simple in structure and easy to implement.

It should be noted that, the second incident section 72 having a circular tubular structure means that the second incident section 72 has a uniform outer diameter and inner diameter in any radial cross section.

Specifically, there are various cases in which the wall thickness of the second incident section 72 is greater than that of the first incident section 71. In a first possible case, as shown in FIG. 2, the outer diameter of the first incident section 71 is less than that of the second incident section 72, and the inner diameter of the first incident section 71 is the same as that of the second incident section 72. That is, the reflecting interface 73 is positioned in a region of an outer edge of the end face of the second incident section 72, and in this case, when the first incident section 71 and the second incident section 72 are processed, the reflecting interface 73 can be obtained only by processing the outer diameters of the first incident section 71 and the second incident section 72, and the processing is simple in process.

In a second possible case, as shown in FIG. 3, the outer diameter of the first incident section 71 is the same as that of the second incident section 72, and the inner diameter of the first incident section 71 is greater than the inner diameter of the second incident section 72. That is, the reflecting interface 73 is positioned in a region of an inner edge of the end face of the second incident section 72, and in this case, when the first incident section 71 and the second incident section 72 are processed, the reflecting interface 73 can be obtained only by processing the inner diameters of the first incident section 71 and the second incident section 72, and the processing is simple in process.

In a third possible case, as shown in FIG. 4, the outer diameter of the first incident section 71 is less than that of the second incident section 72, and the inner diameter of the first incident section 71 is greater than the inner diameter of the second incident section 72. That is, the reflecting interface 73 is formed in both the region of the inner edge of the end face of the second incident section 72 and the region of the outer edge of the end face of the second incident section 72.

The torque has a reflection coefficient T at the joint of the first incident section 71 and the second incident section 72, that is, the reflection coefficient of the torque wave on the reflecting interface 73 is R, R=1−T, wherein T is a transmission coefficient of the torque at the joint of the first incident section and the second incident section, $$T = \frac{2\left(\frac{A_1 \rho_1 I_1}{A_2 \rho_2 I_2}\right)}{\sqrt{4\left(\frac{A_1 \rho_1 I_1}{A_2 \rho_2 I_2}\right)^2 + 1}},$$

and 0.25≤T<1, wherein $A_1$ is the cross-sectional area of the first incident section 71, $\rho_1$ is a density of the first incident section 71, $I_1$ is a moment of inertia of the first incident section 71, $A_2$ is the cross-sectional area of the second incident section 72, $\rho_2$ is a density of the second incident section 72, and $I_2$ is a moment of inertia of the second incident section 72. Moreover, $I_1=\frac{1}{2}m_1(R_1^2-r_1^2)$, wherein $m_1$ is a mass of the first incident section 71, $R_1$ is a radius of an outer side wall of the first incident section 71, and $r_1$ is a radius of an inner side wall of the first incident section 71; and $I_2=\frac{1}{2}m_2(R_2^2-r_2^2)$, wherein $m_2$ is a mass of the second incident section 72, $R_2$ is a radius of an outer side wall of the second incident section 72, and $r_2$ is a radius of an inner side wall of the second incident section 72.

The densities of the first incident section 71 and the second incident section 72 are determined by the materials of the first incident section 71 and the second incident section 72, and the masses of the first incident section 71 and the second incident section 72 can be obtained by weighing, so that the moments of inertia of the first incident section 71 and the second incident section 72 is substituted into the formula of the transmission coefficient T, and a relationship between the transmission coefficient T and the radii of the inner side wall and the outer side wall of the first incident section 71, and a relationship between the radii of the inner side wall and the radius of the outer side wall of the second incident section 72 can be obtained, thereby facilitating the calculation of the values of the radii of the inner side wall and the outer side wall of the first incident section 71, the radii of the inner side wall and the outer side wall of the second incident section 72, and the reflection coefficient of the reflecting interface 73.

Moreover, since the first incident section 71 and the second incident section 72 are both of circular-ring tubular structures, the radius of the inner side wall of the first incident section 71, $r_1=R_1-t_1$, wherein 40 mm≤$R_1$<60 mm, $t_1$ is the wall thickness of the first incident section 71, 5 mm≤$t_1$<10 mm; the radius of the inner side wall of second incident section 72, $r_2=R_2-t_2$, wherein 40 mm<$R_2$≤60 mm, $t_2$ is the wall thickness of the second incident section 72, 5 mm<$t_2$≤10 mm.

Therefore, by combining these formulas of R=1−T, $$T = \frac{2\left(\frac{A_1 \rho_1 I_1}{A_2 \rho_2 I_2}\right)}{\sqrt{4\left(\frac{A_1 \rho_1 I_1}{A_2 \rho_2 I_2}\right)^2 + 1}},$$

$$I_1 = \frac{1}{2}m_1(R_1^2 - r_1^2),$$

$$I_2 = \frac{1}{2}m_2(R_2^2 - r_2^2),$$

$$r_1 = R_1 - t_1$$

and $r_2=R_2-t_2$ and 0.25≤T<1, 40 mm≤$R_1$<60 mm, 5 mm≤$t_1$<10 mm, 40 mm<$R_2$≤60 mm and 5 mm<$t_2$≤10 mm, an appropriate reflection coefficient of the reflecting interface 73, values of radii of the inner side wall and the outer side wall of the first incident section 71, values of radii of the inner side wall and the outer side wall of the second incident section 72 are selected through the calculation of a computer, so that the calculation of sizes of the first incident section 71 and the second incident section 72 is effectively simplified.

Moreover, a failure in reflection of the reflected torsional wave at the reflecting interface 73 is easily caused by excessively large or excessively small changes in the cross-sectional area of the first incident section 71 and the cross-sectional area of the second incident section 72, in the shape of the cross-section of the first incident section 71 and the shape of the cross-section of the second incident section 72, and in the densities of the first incident section 71 and the second incident section 72 at the reflecting interface 73.

Based on this, in this embodiment, the first incident section 71 and the second incident section 72 may be made of the same material, that is, the first incident section 71 and the second incident section 72 have the same density, and the shape of the cross section of the first incident section 71 and the shape of the cross section of the second incident section 72 are both circular rings, so that when the lengths of the first incident section 71 and the second incident section 72 are the same, the transmission coefficient of the reflected torsional wave at the reflecting interface 73 is only related to the radii of the inner side wall and the outer side wall of the first incident section 71 and the radii of the inner side wall and the radius of the outer side wall of the second incident section 72, and the transmission coefficient can be obtained, $$T = \frac{2\left(\frac{R_1^2 - r_1^2}{R_2^2 - r_2^2}\right)^3}{\sqrt{4\left(\frac{R_1^2 - r_1^2}{R_2^2 - r_2^2}\right)^6 + 1}}.$$

In combination with formulas R=1−T, $r_1=R_1-t_1$, and $r_2=R_2-t_2$, based on ranges of T, $R_1$, $t_1$, $R_2$, and $t_2$, the reflection coefficient of the reflecting interface 73, the radii of the inner side wall and the outer side wall of the first incident section 71, the radii of the inner side wall and the outer side wall of the second incident section 72 can be calculated, so that the sizes of the first incident section 71 and the second incident section 72 can be easily calculated conveniently while the reflected torque wave can be reflected on the reflecting interface 73.

Optionally, the wall thickness of the second incident section 72 may be twice that of the first incident section 71. In this way, a distinct reflecting interface 73 can be formed on the end face that is of the second incident section 72 and that faces the first incident section 71, so that the reflected torsional wave can be fully re-reflected and conducted to the specimen 8.

Specifically, when the inner diameter of the first incident section 71 is the same as that of the second incident section 72, that is, when the radius of the inner side wall of the first incident section 71 is the same as that of the inner side wall of the second incident section 72, the relationship between the radius of the outer side wall of the first incident section 71 and the radius of the outer side wall of the second incident section 72 is such that the radius of the outer side wall of the second incident section 72 is equal to the difference between twice the radius of the outer side wall of the first incident section 71 and the radius of the inner side wall of the first incident section 71, that is, $R_2 = 2 \cdot R_1 - r_1$. When the outer diameter of the first incident section 71 is the same as that of the second incident section 72, that is, when the radius of the outer side wall of the first incident section 71 is the same as that of the outer side wall of the second incident section 72, the relationship between the radius of the inner side wall of the first incident section 71 and the radius of the inner side wall of the second incident section 72 is such that the radius of the inner side wall of the second incident section 72 is equal to the difference between twice the radius of the inner side wall of the first incident section 71 and the radius of the outer side wall of the first incident section 71, that is, $r_2 = 2 \cdot r_1 - R_1$.

In some embodiments, the axial compression device 3 may include an axial compression servo-controlled hydraulic cylinder, and the axial compression servo-controlled hydraulic cylinder is fixed on the base 1, a piston rod of the axial compression servo-controlled hydraulic cylinder may be abutted against an end that is of the second incident section 72 and that is far away from the first incident section 71, and the second incident section 72 may rotate relative to the piston rod of the axial compression servo-controlled hydraulic cylinder. Specifically, a bearing may be arranged at an end that is of the second incident section 72 and that is far away from the first incident section 71, so that the second incident section 72 can be abutted against a piston rod of the axial compression servo-controlled hydraulic cylinder and can also rotate relative thereto. Therefore, the torque loading device 5 is not limited by the axial compression device 3 when applying torque to the second incident section 72.

Figure 5:
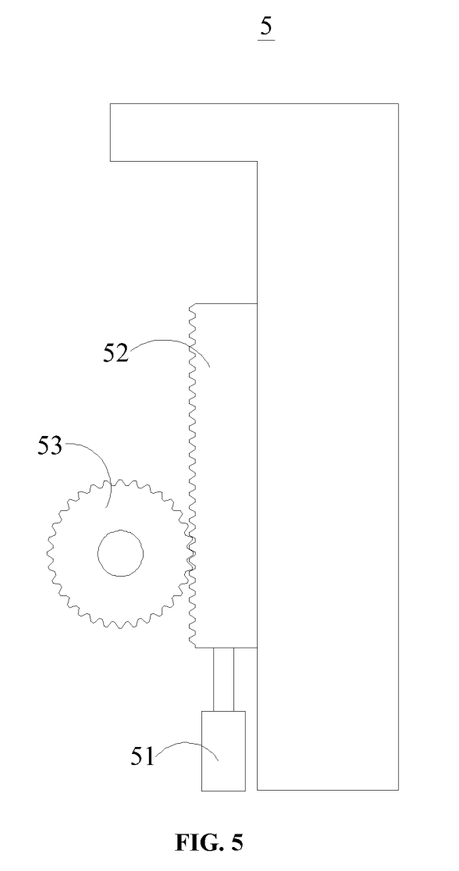
FIG. 5 is a schematic diagram of a structure of a torque loading device according to an embodiment of the present invention.

In some embodiments, as shown in FIG. 5, the torque loading device 5 includes racks 52 and gears 53 which are engaged with each other, the racks 52 are fixed on the base 1, and the gears 53 are fixedly connected to the second incident section 72. By arranging the racks 52 and the gears 53 which are engaged with each other, the gears 53 can apply torque to the second incident section 72 when the gears 53 fixedly connected to the second incident section 72 rotate relative to the racks 52. The rotation rate of the gears 53 can be regulated and controlled, and the control is convenient, so that the safety and the high efficiency of torque application are ensured, which is simple in structure and easy to implement.

Specifically, the torque loading device 5 further includes a torque servo-controlled hydraulic cylinder 51, an output end of the torque servo-controlled hydraulic cylinder 51 is connected to the racks 52, and the change of the pressure in the torque servo-controlled hydraulic cylinder 51 is controlled to adjust the front and back expansion of the output end of the torque servo-controlled hydraulic cylinder 51, so that the racks 52 move up and down, which drives the gears 53 to rotate, so as to apply torque to the second incident section 72.

Figure 6:
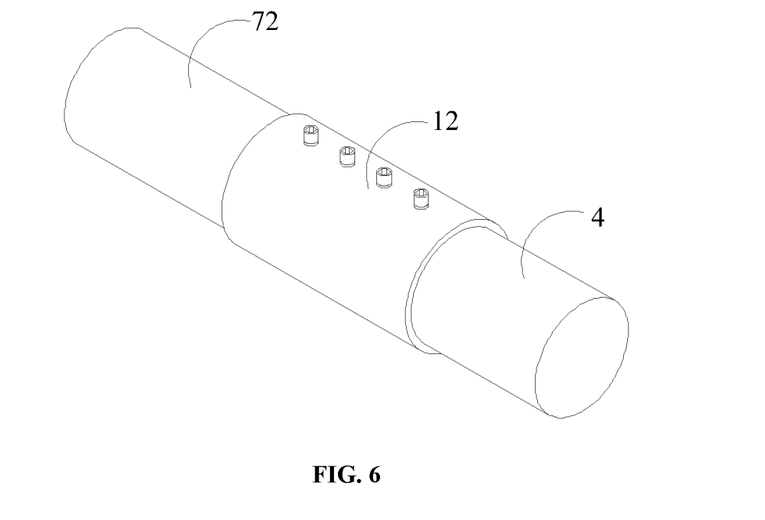
FIG. 6 is a schematic diagram of a structure of an assembly of a second incident section, an energy storage bar and a sleeve according to an embodiment of the present invention.

In addition, the fixed connection of the gears 53 and the second incident section 72 is implemented in a plurality of manners, and the gears 53 and the second incident section 72 may be fixedly connected through a key, that is, a key is arranged on the second incident section 72, a key groove is arranged on the gears 53, and the gears 53 and the second incident section 72 are fixedly connected by inserting the key into the key groove. As shown in FIG. 6, the gears 53 may also be fixedly connected to the second incident section 72 through a sleeve 12, the sleeve 12 may be welded to the gears 53, the sleeve 12 is sleeved on the second incident section 72, and the sleeve 12 is fixed to the second incident section 72 through bolts, so that the gears 53 are fixed to the second incident section 72.

Moreover, a fixing base is fixedly arranged on the base 1, a side that is of the fixing base and that faces gears 53 is connected to racks 52, and racks 52 can move relative to the fixing base. The racks 52 are connected to the piston rod of torque servo-controlled hydraulic cylinder 51, so that the torque servo-controlled hydraulic cylinder 51 can push the racks 52 to reciprocate up and down.

Figure 7:
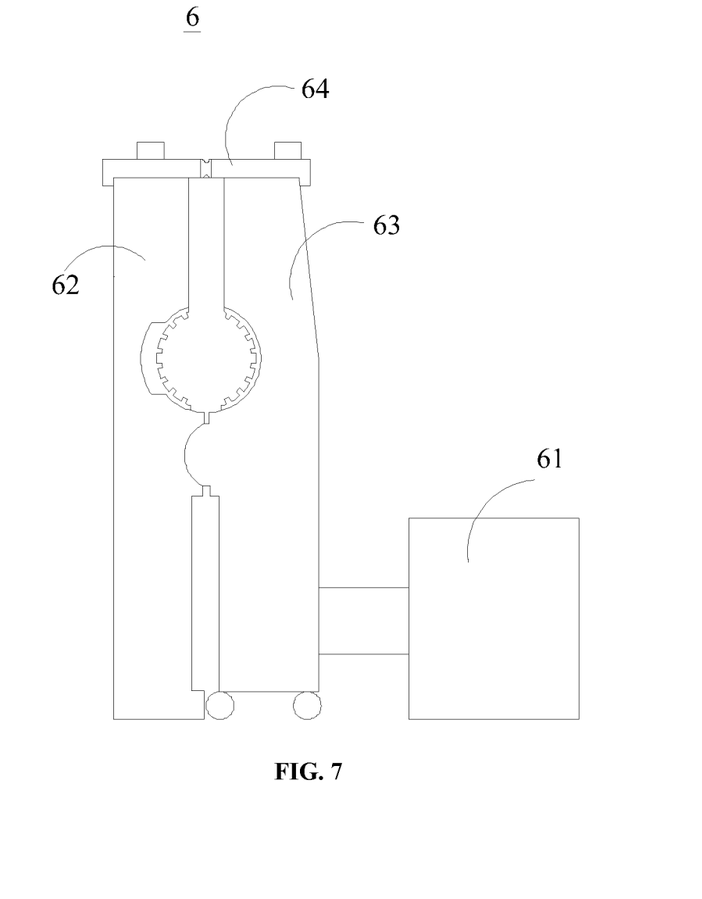
FIG. 7 is a schematic diagram of a structure of a clamping device according to an embodiment of the present invention.

As shown in FIG. 7, the experimental device 100 further includes an energy storage bar 4 and a clamping device 6, wherein one end of the energy storage bar 4 is fixedly connected to the second incident section 72, the other end of the energy storage bar 4 is abutted against the axial compression device 3 and is rotatably connected to the axial compression device 3, and the gears 53 are sleeved on the energy storage bar 4. The clamping device 6 is positioned between the torque loading device 5 and the second incident section 72, the clamping device 6 includes a clamping servo-controlled hydraulic cylinder 61, a fixing plate 64, and a first frictional clamp 62 and a second frictional clamp 63 which are arranged at intervals oppositely, the clamping servo-controlled hydraulic cylinder 61 and the first frictional clamp 62 are both fixedly arranged on the base 1, the second frictional clamp 63 is connected to the base 1 in a sliding manner, and the clamping servo-controlled hydraulic cylinder 61 is connected to the second frictional clamp 63; sides that are of the first frictional clamp 62 and the second frictional clamp 63 and that are far away from the base 1 are both connected to the fixing plate 64, and the energy storage bar 4 penetrates between the first frictional clamp 62 and the second frictional clamp 63; when the second frictional clamp 63 moves to the first frictional clamp 62 through the clamping servo-controlled hydraulic cylinder 61 until the first frictional clamp 62 and the second frictional clamp 63 are both in close contact with the energy storage bar 4, the first frictional clamp 62 and the second frictional clamp 63 can clamp the energy storage bar 4; and when the fixing plate 64 is pulled apart, the first frictional clamp 62 and the second frictional clamp 63 can release the clamping limitation on the energy storage bar 4.

Therefore, when the torque loading device 5 applies torque to the second incident section 72, the torque loading device 5 can first apply torque to the energy storage bar 4, and the energy storage bar 4 can then conduct the torque to the second incident section 72. Moreover, in this case, the energy storage bar 4 can be clamped by the clamping device 6, so that when the torque loading device 5 applies torque to the energy storage bar 4, one end that is of the energy storage bar 4 and that is close to the second incident section 72 cannot rotate, and one end that is of the energy storage bar 4 and that is abutted against the axial compression device 3 is rotatably connected to the axial compression device 3, that is, one end that is of the energy storage bar 4 and that is abutted against the axial compression device 3 is a free end. Therefore, a part that is of the energy storage bar 4 and that is positioned between the axial compression device 3 and the clamping device 6 can rotate, so that the energy storage bar 4 can store torque energy firstly until the fixing plate 64 in the clamping device 6 is pulled apart, the clamping device 6 releases the clamping limitation on the energy storage bar 4, the energy storage bar 4 releases the stored energy to generate a torsional wave, and the torsional wave can be conducted to the specimen 8 along the second incident section 72 and the first incident section 71 in a short period of time, so as to complete the loading of the torque on the specimen 8. The operation steps are simple and easy to implement.

In addition, the torque loading device 5 firstly applies the torque to the energy storage bar 4 and stores the torque on the energy storage bar 4, and the energy storage bar 4 conducts the torque to the second incident section 72, so that the second incident section 72 can be prevented from being twisted to deformation when the torque loading device 5 applies and stores the torque, and the dynamic mechanical property test of the specimen 8 is prevented from being influenced by the deformation of the second incident section 72.

Specifically, one end of the energy storage bar 4 is fixedly connected to the second incident section 72, and the energy storage bar 4 may be welded and fixed to the second incident section 72. The energy storage bar 4 and the second incident section 72 may also be fixed by the sleeve 12, that is, one end of the sleeve 12 is sleeved on the energy storage bar 4, and the other end is sleeved on the second incident section 72. The sleeve 12 is provided with a fixing pin to fix the energy storage bar 4 and the second incident section 72, which is convenient for dismounting and mounting.

In addition, in the clamping device 6, the opposite surfaces of the first frictional clamp 62 and the second frictional clamp 63 are provided with semicircular arc openings, the two semicircular arc openings can form a circular hole, and the energy storage bar 4 penetrates through the circular hole. When the clamping servo-controlled hydraulic cylinder 61 pushes the second frictional clamp 63 to move towards the first frictional clamp 62, the two semicircular arc openings can clamp the energy storage bar 4 tightly, that is, the energy storage bar 4 is locked by clamping, so as to limit the rotation of one end that is of the energy storage bar 4 and that is close to the second incident section 72. Further, an inner wall of the circular hole is provided with strip-shaped teeth to increase the friction force between the semicircular arc openings and the energy storage bar 4.

Moreover, the fixing plate 64 on a side that is of the first frictional clamp 62 and the second frictional clamp 63 and that is far away from the base 1 may be made of a brittle material, such as a thin plastic plate, or a thin ceramic plate. Under the pushing action of the clamping servo-controlled hydraulic cylinder 61, the fixing plate 64 can be pulled apart due to the lever action, so that the first frictional clamp 62 and the second frictional clamp 63 can release the locking limitation on the energy storage bar 4. Therefore, the energy storage bar 4 rotates to release the stored energy, so as to generate a torsional wave.

In addition to the base 1, the incident bar 7, the axial compression device 3, and the torque loading device 5, this experimental device 100 further includes a supporting seat, wherein the supporting seat is fixedly arranged on the base 1, and a top of the supporting seat is provided with a supporting hole. The incident bar 7 penetrates through the supporting hole, and the supporting seat is positioned at the joint of the first incident section 71 and second incident section 72, which plays the role of supporting and fixing the incident bar 7.

In addition, a front baffle plate 2 and a rear baffle plate 10 are further arranged on the base 1, and the front baffle plate 2 and the rear baffle plate 10 are fixedly arranged on the base 1. Pull rods 11 are erected between the front baffle plate 2 and the rear baffle plate 10, the pull rods 11 can be threaded rods, are in threaded connection with the front baffle plate 2 and the rear baffle plate 10, and are fixed through nuts. The number of the pull rods 11 may be four, and four pull rods 11 are symmetrically arranged on two sides of the incident bar 7 in pairs, so as to improve the stability of the whole experimental device 100 when the axial compression device 3 applies axial pressure to the second incident section 72. Moreover, the axial compression device 3 is fixed on the front baffle plate 2, the displacement-constrain structure 9 is fixed on the rear baffle plate 10, and the incident bar 7, the energy storage bar 4, the torque loading device 5, and the clamping device 6 are positioned between the front baffle plate 2 and the rear baffle plate 10.

Figure 8:
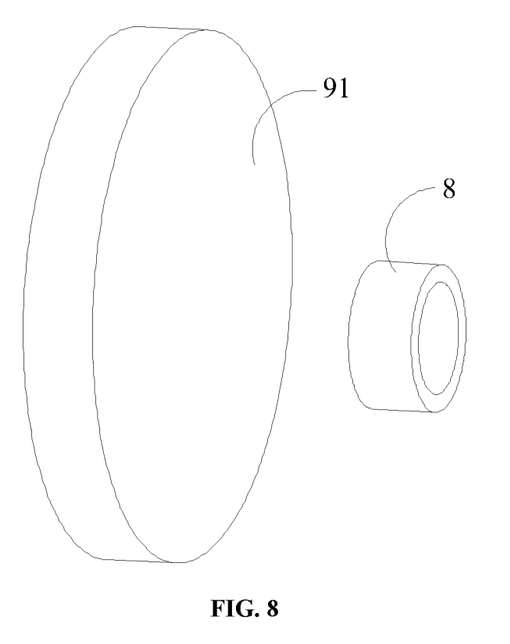
FIG. 8 is a schematic diagram of structures of a displacement-constrain block and a specimen according to an embodiment of the present disclosure.

As shown in FIG. 8, the displacement-constrain structure 9 may be a disc-shaped displacement-constrain block 91, and the displacement-constrain block 91 serves as a retaining structure, and the diameter thereof is far greater than the outer diameter of the incident bar 7, for example, a diameter of the displacement-constrain block 91 may be 8 times of the outer diameter of the incident bar 7, so as to ensure that the displacement-constrain block 91 has a large moment of inertia, so that when the specimen 8 rotates under the action of the torque, the displacement-constrain block 91 can remain stationary relative to the base 1.

Embodiment 2

Figure 9:
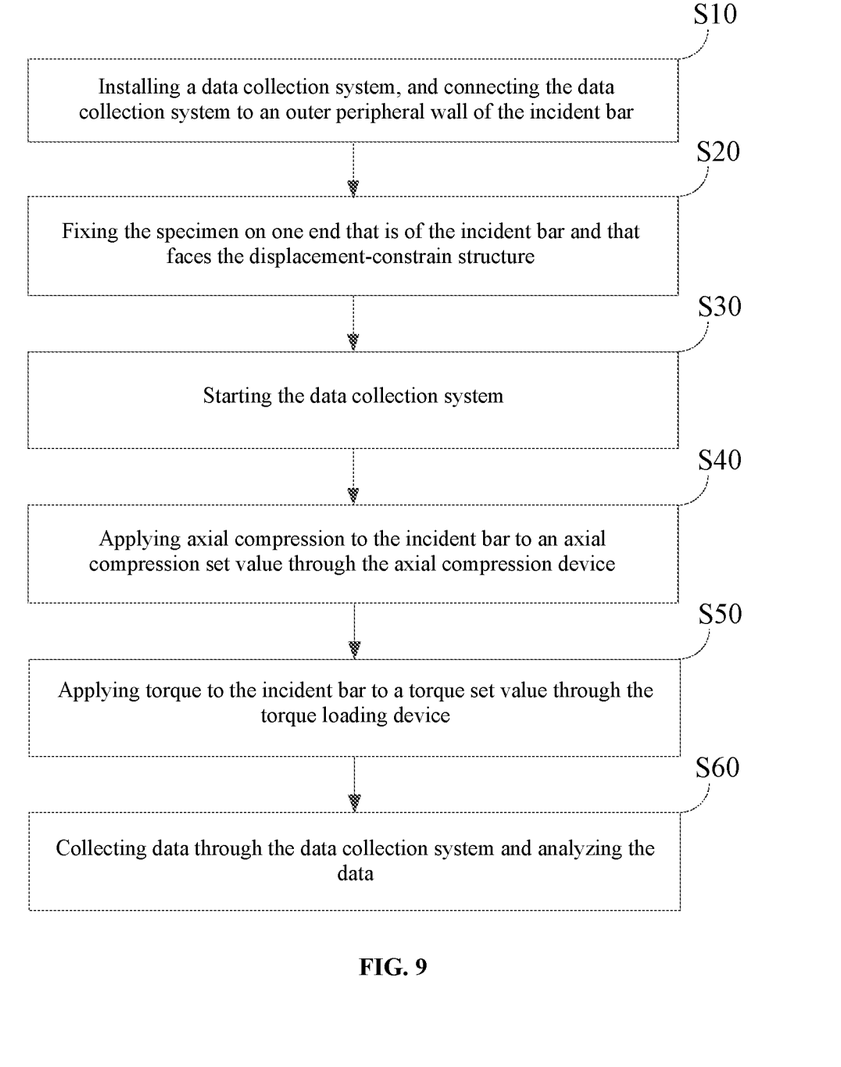
FIG. 9 is a flowchart of a method for testing dynamic mechanical property of a specimen according to an embodiment of the present invention.

An embodiment further provides a method for testing dynamic mechanical property of a material, which is applied to the dynamic friction experimental device in Embodiment 1, as shown in FIG. 9, wherein the method includes:

S10: Installing a data collection system, and connecting the data collection system to an outer peripheral wall of the incident bar.

S20: Fixing the specimen on one end that is of the incident bar and that faces the displacement-constrain structure.

S30: Starting the data collection system.

S40: Applying axial compression to the incident bar to an axial compression set value through the axial compression device.

S50: Applying torque to the incident bar to a torque set value through the torque loading device.

S60: Collecting data through the data collection system and analyzing the data.

In this embodiment, the dynamic mechanical property of the specimen 8 can be tested on the dynamic friction experimental device by this method, and the specimen can be subjected to multiple continuous dynamic torque loading with different amplitudes in a short period of time, so that the dynamic mechanical property parameter of the specimen 8 measured by the method is closer to the dynamic mechanical property parameter of the specimen 8 in an actual stress environment. Moreover, the dynamic friction experimental device applied by the method is the dynamic friction experimental device in Embodiment 1, so that the method for testing the dynamic mechanical property of the material can produce the same or similar beneficial effects as the experimental device 100 in Embodiment 1. Details are not described herein again.

Specifically, in step S10, the data collection system may include a strain gauge, a bridge box, a strain amplifier, an oscilloscope, and a computer, wherein the strain gauge is attached to an outer peripheral wall of the incident bar 7 at an angle of 45° relative to an axial direction of the incident bar 7, and then the strain gauge is electrically connected to the strain amplifier through the bridge box, the strain amplifier is electrically connected to the oscilloscope, and the oscilloscope is electrically connected to the computer, so that the measured data is analyzed, calculated, and stored at the computer end through software. In order to improve the testing precision, strain gauges can be attached to an upper side and a lower side of the same position of the incident bar 7, and the strain gauges need to be air-dried for 1-2 days after being adhered to the incident bar 7, so that the strain gauges are better coupled with pulse signals. Preferably, the strain gauges are attached to a position that is on the first incident section 71 and that is at an intermediate position between the reflecting interface 73 and the specimen 8 for subsequent data processing.

In step S20, the specimen 8 with the circular-ring tubular structure may be adhered to the end face that is of the first incident section 71 and that faces the displacement-constrain structure 9 by glue, and after the specimen 8 is fixed on the first incident section 71, the dynamic mechanical property of the specimen 8 may be tested.

In step S30, the data collection system is powered on, and a certain instantaneous load is applied to the incident bar 7, for example, the incident bar 7 is lightly tapped, and the waveforms collected by the data collection system are observed to check the operation condition of the data collection system and check whether there is interference signal disturbance. If there is a strong interference signal, an attempt is made to eliminate the disturbance, and after all is normal, the next operation can be started.

In step S40, before the axial compression is applied to the incident bar 7 through the axial compression device 3, it is further checked whether the nuts at both ends of the pull rods 11 are tightened, whether the connection between the energy storage bar 4 and the incident bar 7 is firm, and whether the clamping device 6, the axial compression device 3, and the torque loading device 5 are normal. After the safety of the test area is ensured, the power supply is turned on, the axial compression value is set, the axial compression servo-controlled hydraulic cylinder is started, the piston rod of the axial compression servo-controlled hydraulic cylinder pushes the energy storage bar 4 to move under the action of oil pressure so as to push the incident bar 7 to move until the specimen 8 is in close contact with the displacement-constrain block 91. In this case, the axial compression of the axial compression servo-controlled hydraulic cylinder continues to increase gradually until the axial compression set value is reached, and the value is kept.

In step S50, the power supply is turned on, a torque value is set, the torque servo-controlled hydraulic cylinder 51 is started, the racks 52 are controlled to gradually rise, and the gears 53 are driven to rotate. Since the gears 53 are fixedly connected to the incident bar 7, the incident bar 7 is fixedly bonded with the specimen 8, and the specimen 8 is abutted against the displacement-constrain block 91, so that a static friction force is provided between the specimen 8 and the displacement-constrain block 91, that is, before the torque applied to the incident bar 7 is not greater than the maximum static friction force between the specimen 8 and the displacement-constrain block 91, the incident bar 7 is in a static state. In this case, one end that is of the incident bar 7 and that is abutted against the axial compression device 3 is a free end, so that the torque energy applied to the incident bar 7 is stored on the incident bar 7 firstly. When the torque on the incident bar 7 is greater than the maximum static friction force between the specimen 8 and the displacement-constrain block 91, the incident bar 7 drives the specimen 8 to rotate together. In this case, the axial compression of the torque servo-controlled hydraulic cylinder 51 continues to gradually increase until the torque set value is reached, and the value is kept. The incident bar 7 and the specimen 8 continue to rotate and gradually slow until the specimen 8 stops rotating, and in the process of applying the torque until the specimen 8 stops rotating, the torque is conducted to the specimen 8 in the form of a wave and is repeatedly conducted between the specimen 8 and the reflecting interface 73.

In step S60, after the torque acts on the specimen 8 in the form of the wave, data of the torsional wave is collected by the strain gauge and displayed on the oscilloscope, and then the dynamic mechanical property of the specimen 8 during multiple loading actions in a short period of time, such as the stress state of the specimen 8 relative to a frictional interface before sliding, and the changes in a slip rate, a friction force and a friction coefficient during sliding, can be further analyzed according to the data obtained by the test, so as to obtain the mechanical behavior evolution of the specimen 8 during the whole friction process before and after the torque is applied, and sequentially invert behaviors of various materials before instability under different stress environments.

Finally, after the steps are completed, the axial compression device 3 is firstly adjusted to start pressure release until the oil pressure value of the axial compression servo-controlled hydraulic rod is zero. Similarly, the oil pressure value is adjusted to be zero by adjusting torque loading device 5, the racks 52 are returned to the original position, and then the specimen 8 is recovered for subsequent study and analysis.

In some embodiments, the experimental device 100 further includes a clamping device 6 and an energy storage bar 4, wherein one end of the energy storage bar 4 is fixedly connected to one end that is of the incident bar 7 and that is far away from the specimen 8, the other end of the energy storage bar 4 is abutted against and rotatably connected to the axial compression device 3, the clamping device 6 is fixedly arranged on the base 1 and is positioned between the torque loading device 5 and the incident bar 7, and the energy storage bar 4 penetrates through the clamping device 6.

Figure 10:
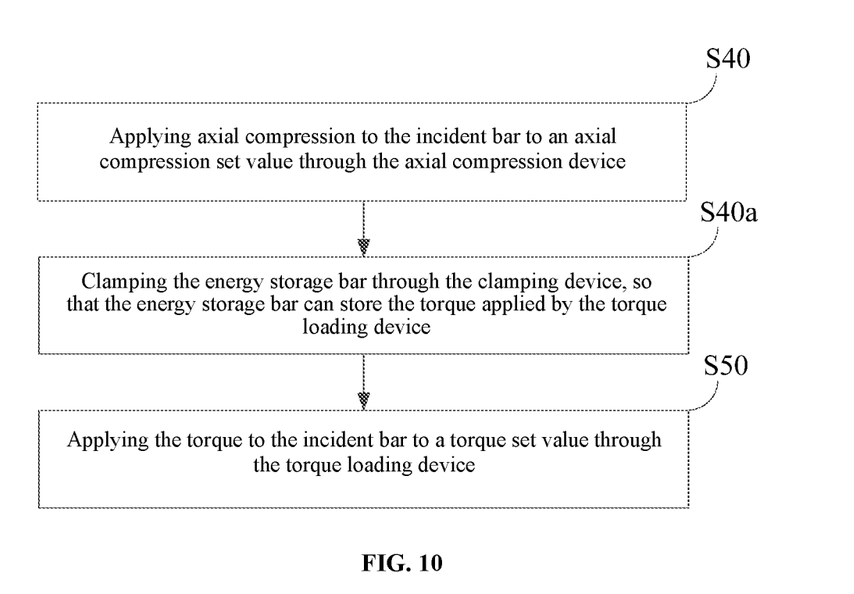
FIG. 10 is a flowchart of clamping an energy storage bar through a clamping device according to the embodiment of the present invention.

At this time, after the axial compression is applied to the incident bar 7 through the axial compression device 3 to an axial compression set value, and before the torque is applied to the incident bar 7 through the torque loading device 5 to a torque set value, as shown in FIG. 10, the method may further include the following steps:

S40a: Clamping the energy storage bar through the clamping device, so that the energy storage bar can store the torque applied by the torque loading device.

Specifically, the pressure value of the clamping device 6 is firstly set, then the clamping servo-controlled hydraulic cylinder 61 in the clamping device 6 is opened, and pressure is gradually applied to the second frictional clamp 63 until a predetermined pressure value is reached. In this case, the energy storage bar 4 is subjected to the friction action of the first frictional clamp 62 and the second frictional clamp 63, so that a part that is of the energy storage bar 4 and that is positioned between the axial compression device 3 and the clamping device 6 performs rotation and stores energy.

Figure 11:
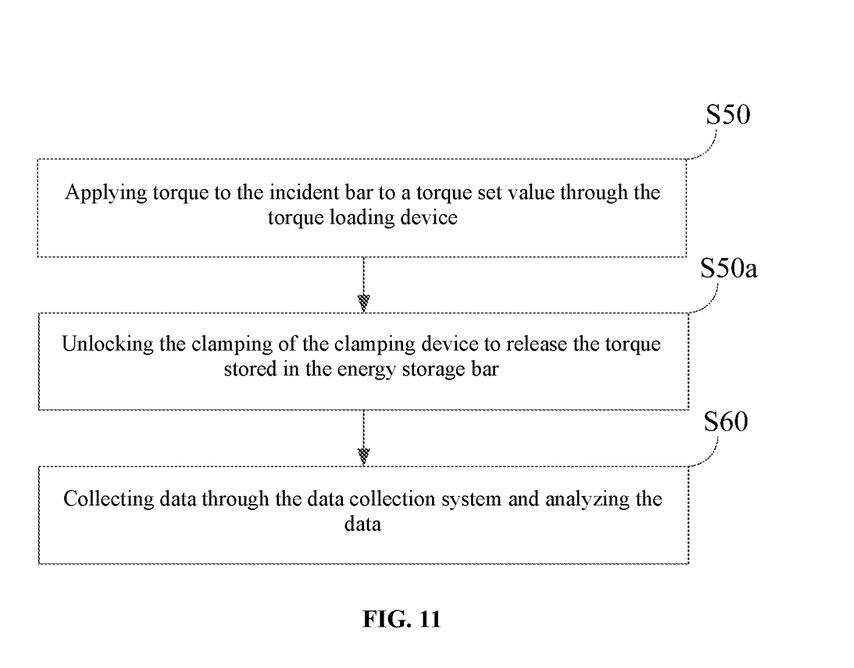
FIG. 11 is a flowchart of releasing the clamping limitation on an energy storage bar through a clamping device according to an embodiment of the present invention.

After the torque is applied to the incident bar 7 through the torque loading device 5 to a torque set value, and before the data is collected by the data collecting system and analyzed, as shown in FIG. 11, the method further includes:

S50a: Unlocking the clamping of the clamping device to release the torque stored in the energy storage bar.

Specifically, when the torque loading reaches a torque set value, the racks 52 stop moving. In this case, the clamping servo-controlled hydraulic cylinder 61 continues to push the second frictional clamp 63 to move until the fixing plate 64 is pulled apart under the lever action. In this case, the friction force between the first frictional clamp 62 and the second frictional clamp 63 and the energy storage bar 4 disappears, the energy stored in the energy storage bar 4 is released, and the torsional wave is conducted along the incident bar 7 and acts on the specimen 8, the torsional wave is transmitted and reflected after being conducted to the specimen 8. The reflected torsional wave is conducted along the incident bar 7 in a direction away from the specimen 8, reaches the reflecting interface 73 for secondary reflection, and then is reflected back to the specimen 8 again. In this way, the specimen 8 can be subjected to multiple loadings instantaneously.

Finally, it should be noted that the foregoing embodiments are merely intended for describing the technical solutions of the present invention, but not for limiting the present invention. Although the present invention is described in detail with reference to the foregoing embodiments, those of ordinary skill in the art should understand that they may still make modifications to the technical solutions described in the foregoing embodiments or make equivalent replacements to some or all technical features thereof, without departing from the scope of the technical solutions of embodiments of the present invention.

What is claimed is:

1. A dynamic friction experimental device, comprising:
a base, wherein the base is provided with a displacement-constrain structure, and the displacement-constrain structure is abutted against a first end face of a specimen when a dynamic mechanical property of the specimen is tested;
an incident bar, wherein the incident bar and the displacement-constrain structure are positioned on a same side of the base, and the incident bar comprises at least two sections, wherein the at least two sections are coaxially arranged, a first incident section of the at least two sections is arranged adjacent to the displacement-constrain structure, and a second incident section of the at least two sections is connected to the first incident section; at a joint of the first incident section and the second incident section, a cross-sectional area of the first incident section is less than a cross-sectional area of the second incident section, and a projection of a cross section of the first incident section is positioned in a cross section of the second incident section along an axial direction of the second incident section; when the dynamic mechanical property of the specimen is tested, an end of the first incident section is abutted against a second end face of the specimen, wherein the end of the first incident section faces the displacement-constrain structure;
an axial compression device, wherein the axial compression device is connected to an end of the second incident section, wherein the end of the second incident section is far away from the first incident section, and the axial compression device is configured to apply pressure to the second incident section;
a torque loading device, wherein the torque loading device is connected to the second incident section, and the torque loading device is configured to apply torque to the second incident section;
an energy storage bar, wherein a first end of the energy storage bar is fixedly connected to an end of the incident bar, wherein the end of the incident bar is far away from the specimen, and a second end of the energy storage bar is abutted against and rotatably connected to the axial compression device; and
a clamping device, wherein the clamping device is fixedly arranged on the base and is positioned between the torque loading device and the incident bar, and the energy storage bar penetrates through the clamping device; the energy storage bar is clamped by the clamping device, so that the energy storage bar is configured to stores the torque applied by the torque loading device; and when torque loading reaches a torque set value, a clamping of the clamping device is unlocked to release the torque stored in the energy storage bar.

2. The dynamic friction experimental device according to claim 1, wherein the torque loading device comprises racks and gears, wherein the racks and the gears are engaged with each other, the racks are fixed on the base, and the gears are fixedly connected to the second incident section.

3. The dynamic friction experimental device according to claim 2, wherein the experimental device further comprises:
the energy storage bar, wherein the first end of the energy storage bar is fixedly connected to the second incident section, the second end of the energy storage bar is abutted against the axial compression device and is rotatably connected to the axial compression device, and the gears are sleeved on the energy storage bar; and
the clamping device, wherein the clamping device is positioned between the torque loading device and the second incident section, and the clamping device comprises a clamping servo-controlled hydraulic cylinder, a fixing plate, a first frictional clamp and a second frictional clamp, wherein the first frictional clamp and the second frictional clamp are arranged at intervals oppositely; the clamping servo-controlled hydraulic cylinder and the first frictional clamp are fixedly arranged on the base, and the second frictional clamp is connected to the base in a sliding manner; a side of the first frictional clamp and a side of the second frictional clamp are connected to the fixing plate, wherein the side of the first frictional clamp and the side of the second frictional clamp are far away from the base, and the energy storage bar penetrates between the first frictional clamp and the second frictional clamp; the clamping servo-controlled hydraulic cylinder is connected to the second frictional clamp, wherein when the second frictional clamp moves to the first frictional clamp through the clamping servo-controlled hydraulic cylinder until the first frictional clamp and the second frictional clamp are in close contact with the energy storage bar, the first frictional clamp and the second frictional clamp are configured to clamp the energy storage bar; and when the fixing plate is pulled apart, the first frictional clamp and the second frictional clamp are configured to release a clamping limitation on the energy storage bar.

4. The dynamic friction experimental device according to claim 1, wherein the specimen is of a circular-ring sheet structure, and the first incident section is of a first circular-ring tubular structure; wherein an inner diameter of the first incident section is less than an outer diameter of the specimen, and an outer diameter of the first incident section is greater than an inner diameter of the specimen.

5. The dynamic friction experimental device according to claim 4, wherein the second incident section is of a second circular-ring tubular structure, and a wall thickness of the second incident section is greater than a wall thickness of the first incident section.

6. The dynamic friction experimental device according to claim 5, wherein the outer diameter of the first incident section is less than an outer diameter of the second incident section, and the inner diameter of the first incident section is same as an inner diameter of the second incident section;

or, the outer diameter of the first incident section is same as the outer diameter of the second incident section, and the inner diameter of the first incident section is greater than the inner diameter of the second incident section.

7. The dynamic friction experimental device according to claim 6, wherein the torque has a reflection coefficient R at the joint of the first incident section and the second incident section, R=1−T, wherein T is a transmission coefficient of the torque at the joint of the first incident section and the second incident section, $$T = \frac{2\left(\frac{A_1 \rho_1 I_1}{A_2 \rho_2 I_2}\right)}{\sqrt{4\left(\frac{A_1 \rho_1 I_1}{A_2 \rho_2 I_2}\right)^2 + 1}},$$

and $0.25 \leq T < 1$, wherein $A_1$ is the cross-sectional area of the first incident section, $\rho_1$ is a density of the first incident section, $I_1$ is a moment of inertia of the first incident section, $A_2$ is the cross-sectional area of the second incident section, $\rho_2$ is a density of the second incident section, and $I_2$ is a moment of inertia of the second incident section; and $$I_1 = \frac{1}{2} m_1 (R_1^2 - r_1^2),$$

wherein $m_1$ is a mass of the first incident section, $R_1$ is a radius of an outer side wall of the first incident section, and $r_1$ is a radius of an inner side wall of the first incident section; and $$I_2 = \frac{1}{2} m_2 (R_2^2 - r_2^2),$$

wherein $m_2$ is a mass of the second incident section, $R_2$ is a radius of an outer side wall of the second incident section, and $r_2$ is a radius of an inner side wall of the second incident section.

8. The dynamic friction experimental device according to claim 7, wherein the radius of the inner side wall of the first incident section is $r_1 = R_1 - t_1$, wherein 40 mm$\leq R_1 <$60 mm, $t_1$ is the wall thickness of the first incident section, and 5 mm$\leq t_1 <$10 mm; and the radius of the inner side wall of the second incident section is $r_2 = R_2 - t_2$, wherein 40 mm$\leq R_2 <$60 mm, $t_2$ is the wall thickness of the second incident section, and 5 mm$\leq t_2 <$10 mm.

* * * * *